United States Patent [19]

Howley

[11] Patent Number: 4,758,787

[45] Date of Patent: Jul. 19, 1988

[54] PROCESSING QUADRATURE SIGNALS

[75] Inventor: Colin K. Howley, Stonehouse, United Kingdom

[73] Assignee: Renishaw plc, Wotton-under-Edge, United Kingdom

[21] Appl. No.: 79,452

[22] Filed: Jul. 30, 1987

[30] Foreign Application Priority Data

Aug. 8, 1986 [GB] United Kingdom ............... 8619350

[51] Int. Cl.[4] .............................................. G01P 3/60
[52] U.S. Cl. .................................. 324/161; 324/160; 361/239; 340/672
[58] Field of Search ............... 324/160, 161, 163, 166, 324/175, 178, 173; 361/239; 340/672, 658, 648

[56] References Cited

U.S. PATENT DOCUMENTS 3,597,749  8/1971  Uemura et al. ..................... 324/208
3,629,705  12/1971 Walters .
4,199,800  4/1980  Weit .................................... 324/163
4,468,617  8/1984  Ringwall ............................. 324/165

FOREIGN PATENT DOCUMENTS 1528740 10/1978 United Kingdom .

OTHER PUBLICATIONS

Synchro and Resolver Conversion, edited by Geoffrey S. Boyles, published 1980, by Memory Devices Limited, Chapter III, pp. 43–78.

Primary Examiner—Reinhard J. Eisenzopf
Assistant Examiner—Anthony L. Miele
Attorney, Agent, or Firm—Spencer & Frank

[57] ABSTRACT

A frequency-to-voltage converter, as applied to controlling the speed of a motor, comprises: a motor speed encoder (1) producing first and second alternating signals (3a,3b) each at the same, first frequency which frequency is dependent on the said speed, the first and second signals being in quadrature with each other; a reference oscillator (4), for producing third and fourth alternating signals (5a,5b) each at the same, reference frequency, which frequency is higher than said first frequency, the third and fourth signals being in quadrature with each other; and single sideband modulating means (6,7,8) connected to receive the first, second, third and fourth signals and to produce a fifth alternating signal (8a) which is a frequency-shifted version of one of the first and second signals. The fifth signal and one of the third and fourth signals (5b) are applied to respective frequency-to-voltage converters (9,10), the DC output voltages of which are subtracted from each other in a differential amplifier (12). The DC output voltage of the amplifier is proportional to the speed of the motor and is used to control the speed to a desired value. The converter provides a DC signal inherently free from ripple over a wide dynamic range.

7 Claims, 1 Drawing Sheet

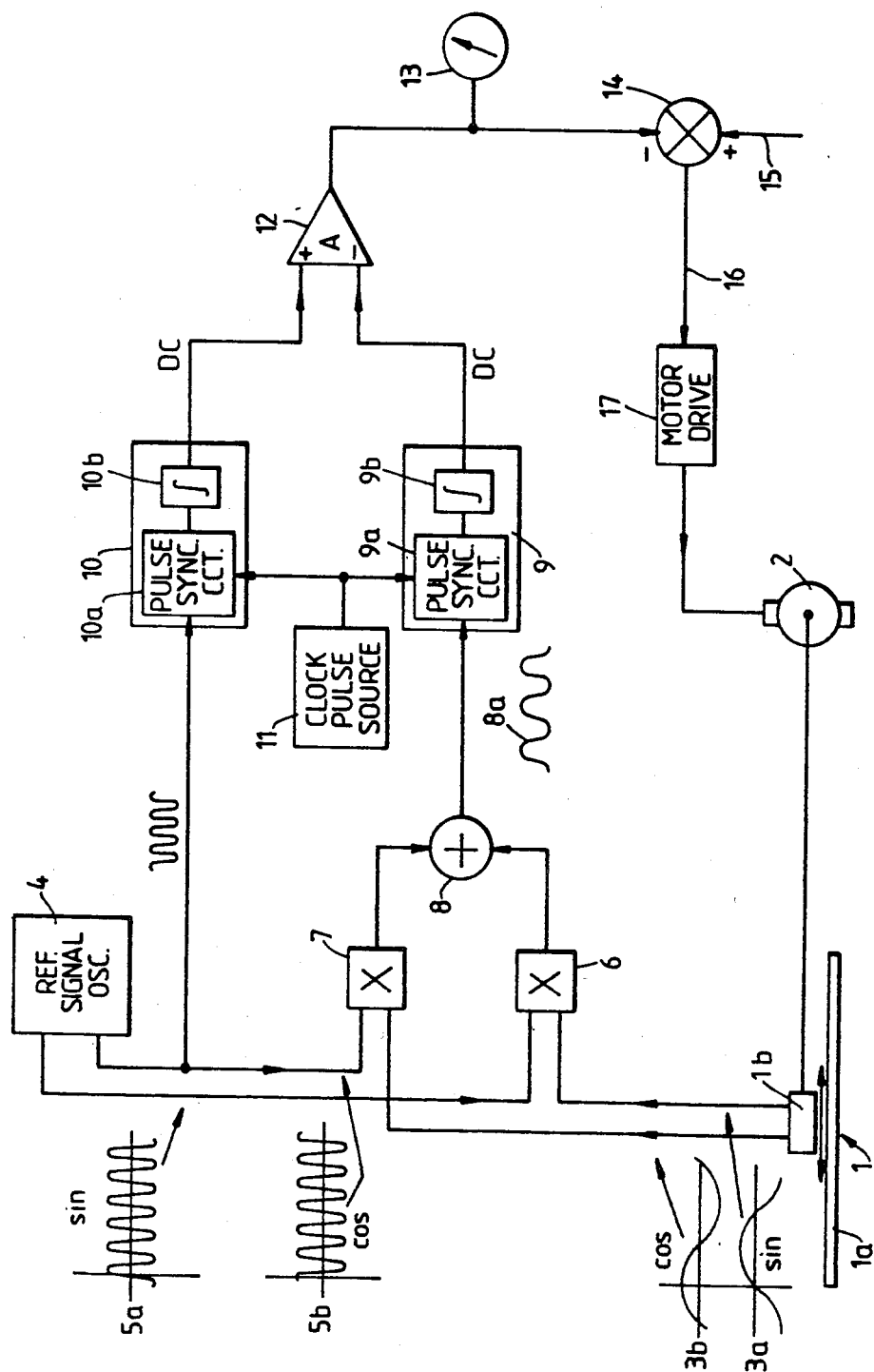

4,758,787

PROCESSING QUADRATURE SIGNALS

FIELD OF THE INVENTION

The present invention relates to processing quadrature signals. More specifically, the present invention relates to devices for converting quadrature AC signals into a signal representative of the AC frequency. Such a device can be of use for processing the quadrature outputs of a transducer such as a position or angle encoder where the frequency is related to a velocity which is to be controlled or measured.

DESCRIPTION OF THE PRIOR ART

U.S. Pat. No. 3,629,705 describes a converter for an angle encoder (namely a resolver), in which there is a reference oscillator and multipliers connected to receive the reference and the quadrature inputs from the resolver. The multiplier outputs are summed to produce a signal having a frequency being that of the reference frequency-shifted by the input frequency. This signal is demodulated to give a unipolar DC output proportional to velocity. However, it is difficult to provide from this unipolar signal an accurate continuous output as the velocity passes through zero (i.e. on a change of direction).

U.S. Pat. No. 4,468,617 describes a more generally applicable converter for a position encoder which solves this problem by taking the difference between the multiplier outputs, as well as the sum. Both the sum and the difference signals undergo frequency-to-voltage conversion, and are then compared. However, this requires extra circuitry to produce the difference signal in addition to the sum.

SUMMARY OF THE INVENTION

According to the present invention, there is provided a device for processing AC input signals which are in quadrature, in order to produce an output representative of the frequency of the input signals, comprising:
- a reference generator for generating a reference signal having a reference frequency,
- frequency shift means for generating, from the quadrature input signals and the reference signal, a frequency-shifted signal which has a frequency being that of the reference signal frequency shifted by the frequency of the input signals,
- first conversion means for receiving the frequency-shifted signal and producing a DC output which directly represents the frequency thereof,
- second conversion means for receiving the reference signal and producing a DC output which directly represents the frequency thereof, and
- means for comparing the outputs of the first and second conversion means to derive said output representative of the frequency of the input signals.

BRIEF DESCRIPTION OF THE DRAWING

The present invention will now be described, by way of example, with reference to the accompanying drawing, which is a schematic block diagram of a motor speed control system.

DESCRIPTION OF PREFERRED EMBODIMENT

Referring to the drawing a first signal generating means 1 comprises a position encoder in the form of a grating scale 1a and an opto-electronic scale reader 1b driven across the scale 1a by the output shaft, for example, of a motor 2 whose speed is to be controlled. The scale reader 1b generates two signals 3a and 3b in quadrature, more particularly sine and cosine signals, each at a frequency determined by the speed of motor 2. It will be appreciated that other transducers giving quadrature outputs could be used, e.g. synchros or resolvers.

A reference signal oscillator 4 produces two signals 5a and 5b in quadrature, more particularly sine and cosine signals, each at a constant, reference frequency greater than the frequency of signals 3a and 3b. A multiplier 6 multiplies the sine signals 3a and 5a, and a multiplier 7 multiplies the cosine signals 3b and 5b, the multipliers 6 and 7 being four-quadrant analogue multipliers.

The multipliers 6 and 7 operate to produce outputs respectively according to the trigonometric equations:

$$\sin x \sin y = \tfrac{1}{2}[-\cos(x+y)+\cos(x-y)] \qquad \text{A}$$

$$\cos x \cos y = \tfrac{1}{2}[\cos(x+y)+\cos(x-y)] \qquad \text{B}$$

The outputs from the multipliers 6 and 7 are connected to respective inputs of an adder 8. As will be apparent from adding equations A and B, the output 8a of adder 8 is a cosine signal having a frequency which is the difference between the frequency of the signals produced by the scale reader 1b and the reference frequency. The circuitry 6,7 and 8 functions as a single sideband modulator producing a frequency difference output which is a frequency-shifted version of signal 3b. Reversal of direction produces the sum of the signals thereby identifying the direction of the movement. If desired the signals 3a,5b and the signals 3b,5a could be respectively multiplied tgether in the multipliers 6 and 7, and/or the adder 8 could be replaced by a subtractor, with similar results.

The output 8a of adder 8 is applied to the input of a first frequency-to-voltage converter 9, the cosine signal 5b from the reference oscillator 4 being applied to a second frequency-to-voltage converter 10. Each of converters 9 and 10 produces an output DC voltage which is proportional to the frequency of its input. Each of frequency-to-voltage converters 9 and 10 comprises: a pulse generating and synchronising circuit 9a or 10a made up of a pair of bi-stable circuits and a counter circuit, the circuits 9a and 10a being controlled by a common clock pulse timing source 11 so that each of circuits 9a and 10a produces an output pulse train at a frequency proportional to the frequency of its input; and an integrating circuit 9b or 10b for carrying out an integrating operation on the output of the associated pulse synchronising circuit 9a or 10a to produce the DC output voltage which is proportional to the frequency of the input to the frequency-to-voltage converter.

The DC output voltages from converters 9 and 10 are applied to respective inputs of a differential amplifier 12 which produces an output which is proportional to the difference between the outputs of converters 9 and 10. The amplifier 12, in combination with components of the integrating circuits 9b and 10b, also acts as filtering circuitry to remove any unwanted remaining alternating components.

It will be seen that the outputs of the converters 9 and 10, which are compared by the differential amplifier 12, are directly representative of the frequency-shifted signal 8a and the reference signal 5b, respectively. This is in contrast to the above-mentioned U.S. Pat. No. 4,468,617, where the sum and difference signals which are compared are both directly representative of frequency-shifted signals, and thus only have an indirect relationship to the reference frequency. Since the present circuit uses the reference signal directly, it is unnecessary to generate both a sum signal and a difference signal.

The output of amplifier 12 is a DC voltage proportional to the speed of motor 2. By virtue of the circuitry 9,10 and 11, the DC voltage output from amplifier 12 is a measure of the speed of motor 2 which is substantially unaffected by frequency drift of the reference signal oscillator 4. Although the output 8a is also a measure of the speed of the motor 2, this output would be affected by frequency drift of the reference signal oscillator 4. The converters 9 and 10 are identical with one another, so that any performance change of one of them due to a change in ambient conditions is mirrored by a corresponding performance change in the other and is cancelled in amplifier 12.

The DC voltage output of amplifier 12 is connected to provide a visual indication of motor speed via an indicating instrument 13. In addition, the DC output voltage from amplifier 12 is applied to one input of an error signal generator 14 to be subtracted from a motor velocity demand signal. An error signal output 16 from error signal generator 14 is applied to a motor drive control means 17 so that the control means 17 causes the motor to be driven at a desired speed.

In one application of the above apparatus, the motor 2 forms part of a high performance servo system and the motor is connected to position a measuring head of a co-ordinate measuring machine. The motor output shaft is connected to a gear box and drive chain to move the measuring head. The signals 3a,3b are generated either by the scale reader 1b being moved by the measuring head itself or by the motor shaft.

In the foregoing example the invention is described as having been used in conjunction with an opto-electronic scale reader but it will be appreciated that the invention is suitable for any pair of alternating input signals of quadrature relationship, e.g. such as produced by other position or angle encoders.

I claim:

1. A device for processing AC input signals which are in quadrature, in order to produce an output representative of the frequency of the input signals, comprising:
   a reference generator for generating a reference signal having a reference frequency,
   frequency shift means for generating, from the quadrature input signals and the reference signal, a frequency-shifted signal which has a frequency being that of the reference signal, frequency shifted by the frequency of the input signals,
   first conversion means for receiving the frequency-shifted signal and producing a DC output which directly represents the frequency thereof,
   second conversion means for receiving the reference signal and producing a DC output which directly represents the frequency thereof, and
   means for comparing the outputs of the first and second conversion means to derive said output representative of the frequency of the input signals.

2. A device according to claim 1, in which the reference generator produces two said reference signals in quadrature; and wherein the frequency shift means comprises two multipliers, each multiplying a respective input signal with a respective reference signal, and means for combining the outputs of the two multipliers.

3. A device according to claim 1, wherein at least one of said first and second conversion means comprises a pulse generating circuit producing an output pulse train at a frequency proportional to the frequency of its input, and an integrating circuit for integrating the output of the pulse generating circuit to produce said DC output.

4. A device according to claim 3 wherein both said conversion means comprise a said pulse generating circuit and a said integrating circuit, and wherein there is a common clock pulse timing source for synchronising the pulse generating circuits.

5. A device according to claim 1 wherein the comparing means comprises a differential amplifier.

6. A system for producing an output representative of the speed of a motor, comprising a transducer for producing AC signals in quadrature, each at a frequency determined by the speed of the motor, and a device for receiving said quadrature signals as input signals and processing them in order to produce an output representative of their frequency, said device comprising:
   a reference generator for generating a reference signal having a reference frequency,
   frequency shift means for generating, from the quadrature input signals and the reference signal, a frequency-shifted signal which has a frequency being that of the reference signal, frequency shifted by the frequency of the input signals,
   first conversion means for receiving the frequency-shifted signal and producing a DC output which directly represents the frequency thereof,
   second conversion means for receiving the reference signal and producing a DC output which directly represents the frequency thereof, and
   means for comparing the outputs of the first and second conversion means to derive said output representative of the frequency of the input signals.

7. A system according to claim 6, wherein the output of said device is fed back to control the speed of the motor.

* * * * *